DIRECT MAGNETIC RECORDING SYSTEM FOR TELEVISION SIGNALS EMPLOYING A SYNCHRONIZED BIAS OSCILLATOR

Filed Aug. 26, 1966 3 Sheets-Sheet 1

INVENTORS
KATSUYUKI IWAI,
MOTONORI FUKATSU,
FUJIO SATO

United States Patent Office 3,495,033
Patented Feb. 10, 1970

3,495,033

DIRECT MAGNETIC RECORDING SYSTEM FOR TELEVISION SIGNALS EMPLOYING A SYNCHRONIZED BIAS OSCILLATOR

Katsuyuki Iwai, Motonori Fukatsu, and Fujio Sato, Ohta-ku, Tokyo, Japan, assignors to Akai Electric Company Limited, Tokyo, Japan, a corporation of Japan Filed Aug. 26, 1966, Ser. No. 575,344
Claims priority, application Japan, Feb. 26, 1966, 41/11,559
Int. Cl. H04n 5/76
U.S. Cl. 178—6.6 8 Claims

ABSTRACT OF THE DISCLOSURE

A magnetic recording system is disclosed which permits the direct recording of television signals on a magnetic tape. This is accomplished by synchronizing the high frequency bias oscillator signal with the synchronizing pulses in the television signal. Synchronization may be either by bringing the bias oscillator signal into phase coincidence with the synchronizing pulses or by causing the bias oscillator to cease oscillation during the synchronizing pulses.

BACKGROUND OF THE INVENTION

Field of the invention

This invention relates to improvements in and relating to magnetic tape recorders. More specifically, it relates to a magnetic recording system adapted for magnetically recording television signals on an elongated magnetic medium such as magnetic tape in a direct way, or more specifically, without relying upon the high frequency modulation technique for improving the quality of the thus recorded information.

Description of the prior art

In the conventional video tape recorders, generally speaking, a high frequency biasing signal is impressed upon the television signal either in an electrical or in a magnetic way, so as to carry out the magnetic recording relying upon the straight range of B-H curve, so-called, of the magnetic material on the tape, for minimizing otherwise possible distortion of the television signal in the course of recording on the tape.

In this case, the bias frequency signal is generated in an electronic oscillator independently of the television signal fed from a television set to the tape recorder. It has been found that, especially with use of lower frequency bias signal, white-and-black horizontal strips frequently appear on the screen upon which the recorded and reproduced signal is projected. Upon thorough investigation, we have found that the generation of such irritating noise strips on the reproducing television screen is mainly attributable to variable phase differences between the synchronizing signal pulses contained in the processing television signal and the bias frequency signal impressed thereto. These differences are due to the relative and independent nature of the generation of the two signal sources, which in turn produce a beat signal. It is therefore conceivable that the leading or trailing edges of a series of synchronizing pulses contained in the television signal are subjected generally to variable biasing effects by the bias signal, even when the latter be of an ideal constant frequency, as will be more specifically described hereinafter, leading to an irregular shaping of the synchronizing pulses in the course of reproduction thereof.

BRIEF DESCRIPTION OF THE INVENTION

It is therefore the main object of the present invention to provide an improved direct magnetic recording system without relying upon the high frequency biasing technique, capable of avoiding substantially the record of irregularly biased synchronizing signal pulses of a television signal, which causes irritating white-and-black horizontal noise strips on the television screen when the television signal is reproduced and projected thereon in the form of visual picture images.

Although the tape drive system and magnetic head arrangement can be highly simplified when employing the direct magnetic recording technique, for recording television signal, a considerable drawback in this technique resides generally in inferior signal noise ratio. Thus, considerable limitation is imposed on the frequency bandwidth of signals to be transmitted. This drawback leads to an inferior equalization of pick-up television signal in the course of the processing thereof in the reproducing system. In fact, the respective amplitude of sync pulses contained in the pick-up television signal by a reproducing magnetic head, thus being subjected to a differentiating action provided by the head, will be determined by the recording conditions of the leading and trailing edge of each of the sync pulses as met in the course of the recordingly processing stage on the video tape recorder.

It is therefore a further object of the present invention to provide an improved recording system of the kind above referred to, capable of suppressing possible variation in the amplitude of the sync pulse to be subjected to, later in the reproduction stage of the television signal, even with use of a lower frequency bias signal and without any need for increasing the recording current intensity.

BRIEF DESCRIPTION OF THE DRAWINGS

Further objects, features and advantages of the invention will become more clear from the following detailed description taken in conjunction with the accompanying drawings, in which.

DETAILED DESCRIPTION OF THE INVENTION

Figure 1:
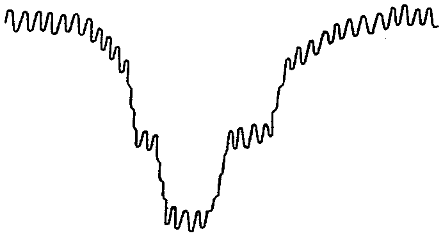
FIG. 1 is a schematic wave form of part of a recorded television signal with a high frequency biasing signal superimposed thereon.
Figure 2:
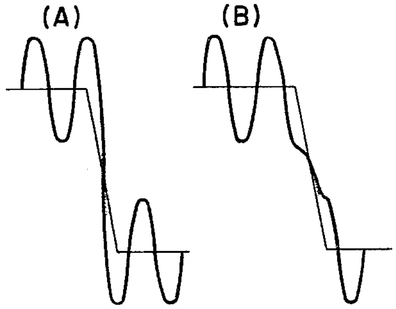
FIGS. 2, (A) and (B), is an enlarged schematic diagram of two examples of synchronizing signal pulses shown substantially at their trailing edge thereof only, illustrating different biasing effects of the biasing signal upon the edges of different synchronizing pulses of a television signal caused by the generally encountered phase difference.

Before entering into describing several embodiments of the present invention, a brief illustration will be made in reference to FIGS. 1–2 of the accompanying drawings.

When a biasing frequency is impressed upon a television signal, the number of repeated frequency and the degree of bias are generally differently observed, especially in the range of the leading and trailing edges of a series of synchronizing pulses contained in the television signal. In FIG. 2 (A) and (B), two different modes of influence by the biasing signal as appearing at the region of trailing edges of synchronizing pulses are illustrated only by way of example. This kind of different influence is rather predominant with lower frequency biasing signals. In this case, a signal beat is generated, as was referred to hereinbefore.

On the other hand, when reproducing the recorded television signal on a magnetic video tape recorder and the like employing the direct recording and direct reproducing technique, the desired perfect equalization of the reproduced signal cannot practically be carried into effect, in consideration of smaller signal-noise ratio thereby realized and of a broader frequency band of the signal to be processed. Thus, the amplitude of synchronizing pulses contained in a reproduced television signal depends substantially upon the recorded conditions of the leading and trailing edges of each of the pulses, even after processed in a conventional equalizer provided in the reproducing system.

In other words, the signal transmission performance of the tape system is highly limited so that when signals containing therein higher frequency signal components as in the case of television signals are to be recorded, the relative speed between magnetic head and tape must be considerably increased in comparison with that normally employed in the conventional audio tape recorders, which, however, correspondingly adversely affects lower frequency signal transmission characteristics, resulting in a reduced signal-noise ratio. From this reason, the aforementioned deficient equalization effect will be encountered and the output will show a slight degree of differentiating effect which means that with higher frequency of the reproduced signal the output may generally have a higher output.

More specifically, when the biasing signal is applied to a television signal in the region of a synchronizing pulse contained in the latter signal as shown in their phase relationship in FIG. 2(A), the amplitude of the pulse when reproduced will be larger than that of the desired standard value. On the other hand, when the biasing signal is impressed upon a synchronizing pulse at its trailing edge in a different manner such as shown schematically in FIG. 2(B) by way of example, the amplitude of the reproduced pulse will be smaller than the standard value. Therefore, it may generally be concluded that when a television signal which has been impressed with a high frequency biasing signal is impressed and magnetically recorded in the direct manner and thereafter reproduced by means of a magnetic reproducing head, the thus reproduced synchronizing pulses will have various and different amplitudes. When such a television signal including variable synchronizing pulses is subjected to a D.C.-restoration as in the conventional manner, the video signal will also be subjected to a similar degree of unintentional fluctuation, thereby generating horizontal black-and-white noise strips on the television screen.

In the conventional video tape recording technique, the frequency of the impressed biasing signal is increased considerably, to a high value such as 10 mc./s., to avoid the aforementioned drawbacks by increasing the repetition frequency at the region of the trailing edge of each of the synchronizing signal pulses, thus equalizing as much as possible the biasing effect in this region. With the use of higher frequency biasing signal, however, the impedance of the record coil of the recording magnetic head will become correspondingly higher so that the power to be supplied to the biasing oscillator should be increased in a corresponding manner which causes a considerable loss of energy.

Another counter measure employed in the conventional technique for avoiding the aforementioned drawbacks is to reduce the strength of the recording current; however, this causes a reduction of the signal noise ratio.

Figure 3:
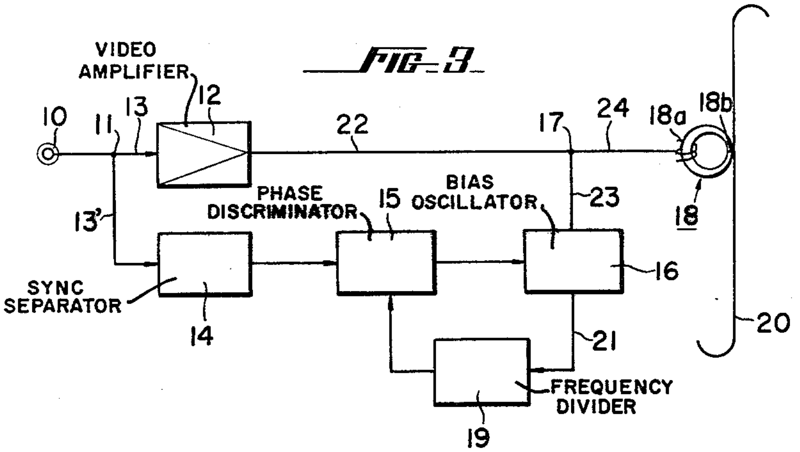
FIGS. 3 and 4 are schematic block diagrams illustrative of two preferred embodiments of the novel recording system.

Next referring to FIG. 3, 10 denotes an input terminal which is arranged to receive television signals from, for instance, a television receiver, vidicon camera or the like conventional signal source, not shown. The terminal 10 is electrically connected through a junction point 11 and lead 13 with a video amplifier 12 which may be of conventional design.

From junction point 11, a lead 13' extends to a synchronizing separating circuit 14 which may be of any conventional design familiar to those skilled in the art and thus only schematically shown by a rectangular block.

Synchronizing separating circuit 14 is electrically connected at its output to the inlet of phase discriminator 15, the outlet of the latter being connected in turn with the inlet of a high frequency biasing oscillator 16 of a conventional design which may be one of those familiar to skilled magnetic tape recorder designers. The design of the phase discriminator 15 may also be of conventional design familiar to television engineers.

The biasing oscillator 16 is connected in turn electrically through lead 23 and junction point 17 to record-and-biasing coil **18*a* of a conventional magnetic record head 18 having a recording slit gap 18*b***, preferably of stationary design and kept as conventionally illustrated. The necessary tape reeling mechanism is omitted from the drawing on account of its highly familiar nature and for simplicity of the drawing.

Numeral 19 denotes a frequency divider arranged to receive through a lead 21 output from biasing oscillator 16 and to divide the frequency by a certain integer such as 200 so as to produce a reference signal having a comparative frequency such as 15.75 kc./s. assuming that the number of scanning lines be 525, to that of the synchronizing signals contained in the television frequency signal applied to input terminal 10.

The operation of the magnetic direct recording system is as follows:

When a television signal is impressed upon the input terminal 10, the signal is conveyed simultaneously through conducting lines 13 and 13', respectively, to video amplifier 12 and synchronizing separator 14. In the separator 14, synchronizing signals are separated from the fed signal and conveyed to phase discriminator 15, wherein the reference frequency signal fed from frequency divider 19 is combined, so as to provide biasing oscillator 16 from the output of discriminator 15 with a control signal which is a function of the phase difference between the synchronizing signal and the reference signal to thereby bring the biasing output signal from the oscillator 16 into coincidence with the horizontal synchronizing signal contained in the television signal. The thus controlled biasing output signal is fed through a conducting line 23 and superimposed at 17 upon the amplified television signal fed from the output of video amplifier 12 through a conducting line 22, thence conveyed through a feed line 24 to record coil **18*a* on magnetic record head 18 for writing through recording gap 18*b*, say, having a length of 1 micron, on magnetic tape 20** running at a predetermined speed such as 60 inches per second. The tape size may be of that standardized for domestic use, although only schematically shown in the television signal thus modified and adjusted, the relative phase relation between the synchronizing pulses and the biasing signal is maintained at a constant, thereby each of the synchronizing pulses being processed by means of a biasing signal with an equal effect. The thus produced series of biased television signals may be easily supposed by imagining a train of video signals interrupted at regular intervals by a number of separated synchronizing pulses, one of which is shown by way of example in FIG. 2(A) or (B).

In place of the amplified television signal, the amplified video signal which is formed by separating synchronizing pulses from the television signal may be fed through lead 22 to the magnetic record coil 18*a* with similar results, by a slight modification of amplifier 12.

Figure 4:
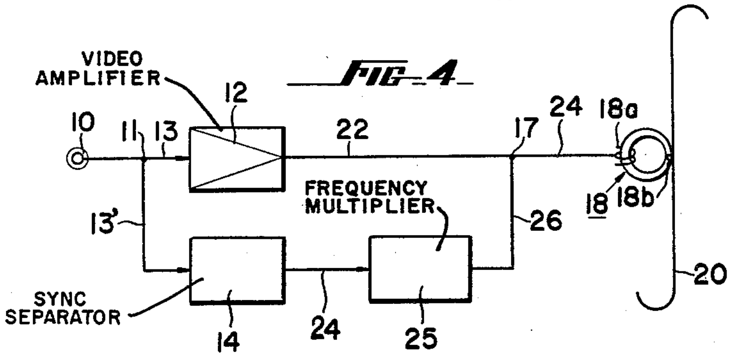

In the second embodiment shown in FIG. 4, similar numerals 10, 11, 12, 13, 13', 14, 17, 18, 18*a*, 18*b*, 20 and 22 are employed to identify similar constituents as before. The output of synchronizing separator 14 is connected through conductive lead 24 to the input of a frequency multiplier 25 which may be of conventional design and is adapted to multiply the inlet signal in its frequency to that of a high frequency biasing signal such as 3.15 mc./s. by way of example. The thus produced biasing signal is fed from the output of the multiplier 25 through conductive lead 26 to junction point 17 and electrically superimposed onto the amplified television signal fed in turn from the output of video amplifier 12 through lead 22 as in the same way set forth in the foregoing embodiment shown in FIG. 3. The thus combined signal is recorded on the magnetic tape 20 through the intermediary of the magnetic record head 18 as before.

It will be clear from the foregoing that also in the embodiment shown in FIG. 4 a definite phase relationship between the synchronizing pulses and the biasing signal is positively established and maintained.

According to a further proposal according to this invention, the biasing oscillator can be so designed and arranged that the output bias current represents periodical interruptions each of which corresponds to each of the horizontal sync pulses contained in the television signal, as will be described more in detail with reference to FIGS. 5(A) and 5(B) hereinbelow.

Figure 5A:
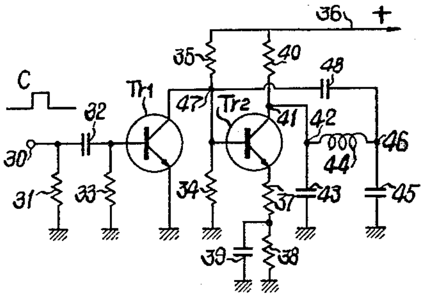
FIG. 5(A) is an embodiment circuit of the biasing signal source to be employed in this invention.
Figure 5B:
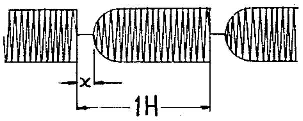
FIG. 5(B) illustrates the wave form of the output bias signal delivered from the signal source shown in FIG. 5(A).

In FIG. 5(A), numeral 30 denotes an input terminal which is electrically connected with a sync separator circuit such as denoted by reference numeral 14 in FIG. 3 or 4, for instance, so as to be fed with a series of separated positive sync pulses having a wave form as at C. This terminal 30 is connected to ground through the intermediary of resistor 31 and further connected electrically through a coupling condenser 32 to the base electrode of a switching transistor T*r*1, said electrode being connected to ground through the intermediary of resistor 33.

The emitter electrode of transistor T*r*1 is connected directly to ground, while the collector electrode is electrically connected to the base electrode of transistor T*r*2 which constitutes a Colpitts oscillator as shown, and serving as the biasing oscillator. The base electrode of the oscillator transistor T*r*2 is connected through a resistor 34 to ground, on the one hand, and through a resistor 35 and a lead 36 to the positive side of a D.C. power source, not shown.

The emitter electrode of the transistor T*r*2 is connected through a series of resistors 37 and 38 and a parallel-connected capacitor 39 to ground. The collector electrode of the transistor is connected through a resistor 40 to the lead 36. At the same time, the collector electrode is connected through junctions 41 and 42 and a capacitor 43 to ground. A coil 44 is inserted between junctions 42 and 46, the latter being grounded through a capacitor 45. Between junction 47 which is provided between resistors 34 and 35 and connected with the emitter electrode of transistor T*r*1, and junction 46, a capacitor 48 is inserted.

When one of the pulses kept in synchronism with the horizontal sync pulses contained in the television signal to be magnetically recorded, and preferably so modified that they have a common peak level equal to plus 140–150% based on the white level of the video signal of the television signal taken as 100%, is fed to the input terminal 30, it is conveyed through condenser 32 to the base electrode of transistor T*r*1 which is thus switched on. Thus, a current will flow through the collector passage through resistor 35 and the collector electrode will become substantially at the ground potential. Since the resistor 35 has been selected to have enough value to saturate the transistor T*r*1, the potential at the base electrode of transistor T*r*2 will thus become lower than that at the emitter electrode and the current through the emitter-collector passage will be interrupted, thereby the oscillation of the oscillator circuit including transistor T*r*2 being ceased. As already mentioned, the pulses to input terminal 30 are fed in synchronism with the horizontal sync pulses contained in the television signal, and thus, the output signal from the oscillator has periodical interruptions as at *x* shown in FIG. 5(B), each of the interruptions corresponding to the duration period of the sync pulse. In this figure, 1H represents the time duration period for horizontal scanning.

At the trailing edge of the pulse fed to input terminal 30, the oscillator will be again energized to initiate its oscillation. Therefore, the biasing signal delivered from the oscillator is kept, in effect, in synchronism with the sync pulses when viewed in its general aspect.

Figure 6A:
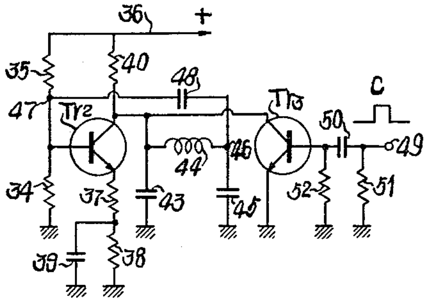
FIGS. 6(A), 7(A) and 8(A) are circuit diagrams of modified bias signal source from that shown in FIG. 5(A).

In FIG. 6(A), a modified circuit from that shown in FIG. 5(A) is shown. In this circuit, circuit components are so designed and arranged that similar pulse series as explained with reference to FIG. 5(A) are fed to the collector electrode of oscillator transistor T*r*2 which is similar to that shown therein. Circuits components 34, 35, 36, 37, 38, 39, 40, 43, 44, 45, 46 and 48 are arranged herein in the same manner as before, so as to constitute again a Colpitts oscillator.

Numeral 49 represents input terminal which is connected through a capacitor 50 to the base electrode of transistor T*r*3. At the both sides of the capactor 50, it is connected through resistors 51 and 52 to ground, in the similar way as those defined by numerals 31, 32 and 33 in FIG. 5(A). Thus, the transistor T*r*3 acts as a switching transistor as before. In this circuit, however, the collector electrodes of the both transistors are connected with each other.

When the pulses as at C are fed successively to input terminal 49, similar effects as described in connection with FIGS. 5(A) and 5(B) will be obtained, as shown in FIG. 6(A) with its output biasing signal form.

Figures 7A, 8A:
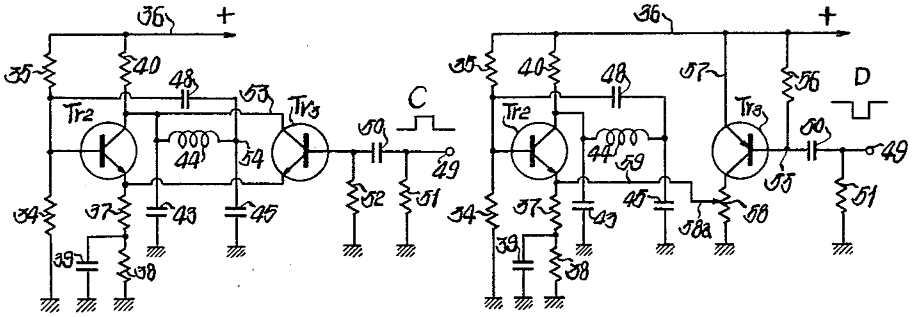

In a still further modified circuit shown in FIG. 7(A), similar Colpitts oscillator comprising oscillating transistor T*r*2 is provided the collector and emitter electrodes of which are supplied pulse series as at C through switching transistor T*r*3. For this purpose, the emitter electrodes of the transistors T*r*2 and T*r*3 are connected through a conductor 54 with each other, and similarly the collector electrodes thereof are connected by a conductor 53 with each other. Other constituents and their mutual connections are similar to those shown and described in FIG. 6(A).

Figure 7B:
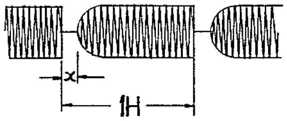

The output biasing signal form from the oscillator circuit is shown schematically in FIG. 7(B). Thus, the effects and function of this circuit will be obvious to those skilled in the art without further analysis.

Figure 6B:
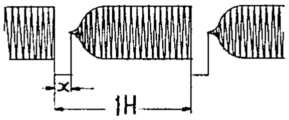
FIGS. 6(B), 7(B) and 8(B) are wave forms of output signals delivered respectively from the bias signal sources shown in FIGS. 6(A), 7(A) and 8(A).

In a still modified embodiment of biasing signal source circuit shown in FIG. 8(A) a similar Colpitts oscillator comprising again oscillator transistor T*r*2 and its related circuit components is shown wherein however the circuit components being so designed and arranged that a series of pulses kept in synchronism with horizontal sync pulses contained in the television signal to be recorded is supplied through switching transistor T*r*3 to the emitter electrode of the oscillator transistor T*r*2. In this case, circuit elements 34, 35, 36, 37, 38, 39, 40, 43, 44, 45, 48, 49, 50 and 51 are designed and arranged substantially in the similar manner as described with reference to FIG. 6. A junction between capacitor 50 and the base electrode of switching transistor T*r*3, is connected to the positively energized lead 36 through the intermediary of a resistor 56, while the emitter electrode of the transistor is directly connected through a lead 57 to the positive lead 36. The collector electrode of the transistor T*r*3 is connected through a variable resistor 58 to ground and the wiper 58*a* thereof is connected through a lead 59 to the emitter electrode of the oscillator transistor T*r*2.

When a pulse of a negatively polarized pulse series as at D is impressed on input terminal 49, the switching transistor T*r*3 is then saturated, thereby the collector-emitter passage of the transistor being turned to conductive and the voltage on the positive lead 36 being impressed across the variable resistor 58.

Figure 8B:
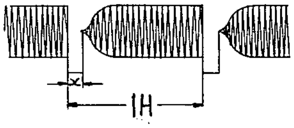

The voltage taken out by the slider 58*a* is then impressed upon the emitter electrode of transistor T*r*2. Since the slider has been so adjusted beforehand that this impressed voltage will be higher than the voltage at the base electrode of this transistor T*r*2, the collector-emitter passage is interrupted, thereby causing the oscillation of the oscillator circuit to cease. It will be therefore seen that this oscillation will be ceased at every negative-going leading edge of the input pulse series and re-energized at every positive-going trailing edge thereof. In this way, a biasing signal interrupted periodically in synchronism of horizontal sync pulses contained in the television signal to be recorded can be again delivered from the output of the biasing oscillation circuit as exemplarly and schematically shown in FIG. 8(B).

Figure 9:
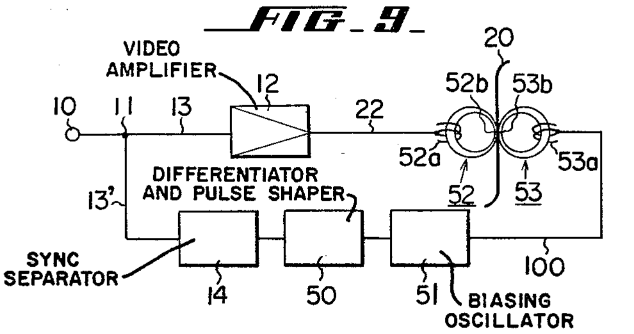
FIG. 9 is a block diagram of a further embodiment of the present invention.

In a still further modified embodiment shown in FIG. 9, numerals 10, 11, 12, 13, 13′, 14, 20 and 22 represent similar circuit components as before. Lead 22 is connected with the working coil at 52*a* of record head 52, having a recording slit gap 52*b* so as to cooperate electromagnetically with magnetic tape 20, as conventionally.

Figure 10:
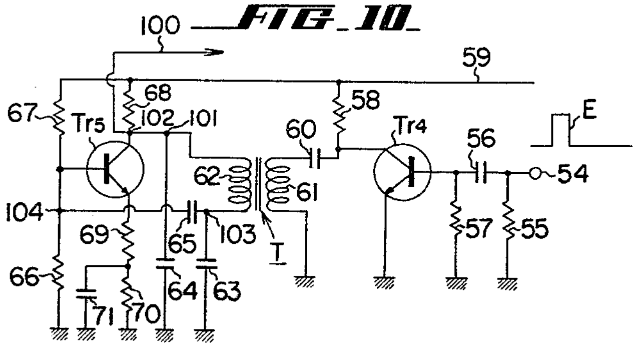
FIG. 10 is a circuit diagram of the biasing oscillator employed in the arrangement shown in FIG. 9.

The output of sync separator 14 is electrically connected with the input of a combined differentiating and rectangular pulse shaper circuit 50, the latter being further connected electrically with a biasing signal circuit 51 which is shown more specifically in FIG. 10.

In operation, the television signal impressed on input terminal 10 is processed in both the record amplifier 12 and the sync separator 14, as before. The separated sync pulses are fed from the separator to the circuit 50 and differentiated and reshaped therein, so as to form a series of rectangular wave pulses of positive polarity and each having a shorter or longer duration period than the oscillation period of the biasing oscillator 51, as the case may be, as schematically shown by comparative wave curves shown in FIGS. 11, (A) and (B), or in FIGS. 12, (A) and (B), respectively.

The thus shaped pulse series kept in synchronism with the sync pulses contained in the television signal to be recorded is fed to the biasing oscillator 51, from which, as will be described more in detail hereinbelow with reference to FIGS. 10–12, a biasing signal kept in synchronism with the horizontal sync pulse series, is delivered through a lead 100 to the working coil at 53*a* of a biasing magnetic head 53 arranged physically in opposition to the record head 52 through the intermediary of the tape 20 and separated normally a small distance from the rear base material surface thereof. This biasing signal is impressed magnetically by the working slit gap 53*b* of biasing head 53 on the recorded television signal delivered from the record amplifier 12.

In the biasing oscillator circuit shown in FIG. 10, numeral 54 denotes input terminal which is connected with the output of the circuit 50, FIG. 9, on the one hand, and through a resistor 55 to ground, on the other hand. The input terminal 54 is further connected electrically through a capacitor 56 to the base electrode of switching transistor T*r*4, said electrode being connected through a resistor 57 to ground, while the emitter electrode is directly connected thereto, as shown. The collector electrode of transistor T*r*4 is electrically connected through a resistor 58 to a positively energized lead 59 which is connected to the positive pole of a DC voltage source, not shown, and at the same time connected through a capacitor 60 and primary winding of transformer T to ground, so as to constitute a pulse impressing circuit. Secondary winding 62 of the transformer, acting as oscillating coil, is connected with its one end through junctions 101 and 102 to the collector electrode of transistor T*r*5, the latter junction being connected to the lead 100 shown in FIG. 9, while the opposite end of the winding 62 is connected through junction 103 and capacitor 63 to ground. Junction 101 is connected through capacitor 64 to ground. Junction 103 is connected through capacitor 65 and junction 104 to the base electrode of transistor T*r*5, said junction being connected through a resistor 66 to ground. The base electrode is connected through a resistor 67 to the positive lead 59 and said junction 102 is connected to the same lead through the intermediary of a resistor 68. The emitter electrode of transistor T*r*5 is connected to series-connected resistors 69 and 70 and a parallel-connected capacitor 71 to ground, so as to constitute a biasing oscillator circuit.

Figure 11:
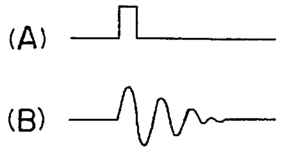
FIGS. 11 and 12 are wave diagrams for the illustration of the working mode of the biasing oscillator shown in FIG. 10.

In operation, a pulse series having positive polarity as at (A) in FIG. 11, each of which has in this case, a shorter duration period than the oscillating period of the oscillator circuit including transistor T*r*5, is impressed from the output of the circuit 50 shown in FIG. 9. This pulse is conveyed through coupling condenser 56 to the base electrode of switching transistor T*r*4 so as to bring the latter to its saturated condition, thereby the transistor becoming conductive and a pulse appearing in the collector passage. This pulse will act through the intermediary of capacitor 60 and primary winding 61 upon the secondary winding 62 of transformer T, thereby inducing in the latter winding a ringing wave voltage as at (B) in FIG. 11, the frequency of which depends upon the specific time constant attributed to the oscillating circuit comprising the transistor T*r*5. On the other hand, when no input pulse is applied on the contrary to the foregoing, the transistor T*r*5 oscillates at the specified frequency defined by the time constant of the oscillator circuit and thus independently of the pulse series to be applied. The ringing voltage is superposed to this regularly oscillating voltage. When the amplitude of the ringing voltage is smaller than that of the regular oscillating voltage as in the abovementioned case, the oscillation is kept unchanged.

However, if the amplitude of the ringing voltage is selected to be equal to or larger than the regular oscillating voltage, the oscillating circuit will perfom its oscillation in correspondence to the phase of the ringing and therefore the phase of the oscillating voltage will become in coincidence with that of the ringing voltage. Even when the ringing has disappeared, the oscillation of the oscillator circuit will continue while keeping the aforementioned phase relation unchanged. When a next succeeding pulse is impressed again upon the input terminal 54, the aforementioned phenomenon will be repeated and the phase of the oscillator output voltage will be constant as before when seen in the course of the duration period of the pulse. The wave form of the oscillating voltage will be therefore subjected to alterations during the impressed pulse periods in comparison with the regular one. Since these altering periods correspond naturally to the flying-back periods in the television signal and further, during each of these periods there is substantially no change in the wave form, no adverse effects will be encountered thereby.

Figure 12:
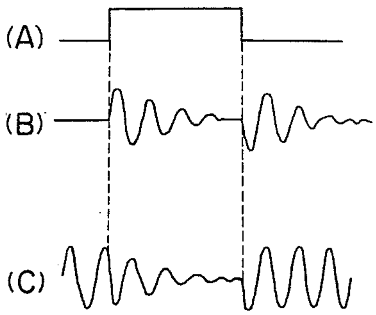

When each of the pulse series impressed to the input termminal 54 is selected to have a longer duration period than the regular period of the oscillation of the oscillator as at (A) in FIG. 12, ringing voltage will be induced in the oscillator coil 62 at each arrival of the leading and trailing edges of the pulse series, as shown at (B) in the same figure, and a synchronizing action can be obtained relying upon each of the descending or trailing edges of the input pulse series. In this case, it should be noted that on account of a low impedance load connected in the oscillator circuit during the pulse duration, the oscillating energy in this duration period is small and thus the desired synchronization can be more easily attained.

Figure 10A:
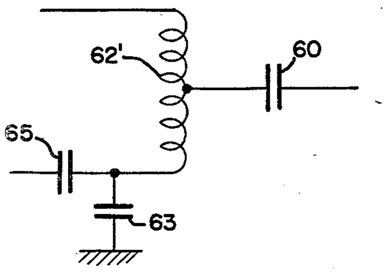

In the aforementioned embodiment, windings 61 and 62 are so arranged that they constitute in combination a kind of transformer as at T. It is however possible to delete the first coil 61 and an intermediate tap, as shown in FIG. 10(A), may be instead provided in the second winding 62 so as to be fed with the input pulse series. Caution should naturally be made to dimension the pulse supplying circuit including the switching transistor T*r*4, especially the winding 61 or the branching tap said above, so as to avoid possible adverse effects upon the oscillator circuit comprising the transistor T*r*5.

It will be easily understood from the foregoing that according to the present invention a lower frequency biasing signal than those employed in the prior art can be easily employed without inviting horizontal noise strips as otherwise appearing on the picture monitor screen upon later reproduction of the biasingly recorded television signal caused by amplitude fluctuation of the reproduced sync pulses. In this case, also, it is not necessary to reduce substantially the record current intensity. Losses to be caused by the otherwise employment of a higher frequency biasing signal can also be avoided and a considerable improvement of the signal noise ratio in the reproduced television signal may be attained according to the novel technique proposed by the present invention.

While the invention has been particularly shown and described with reference to several preferred embodiments thereof, it will be understood by those skilled in the art that various changes in form and details may be made therein without departing from the spirit and scope of the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim is:

1. In a magnetic recording system adapted for magnetically recording television signals on an elongated magnetic medium in a direct way, comprising an input means connected to a television signal source for receiving therefrom a television signal, amplifier means adapted for amplifying the signal, a synchronizing signal separator for separating sync pulses from the television signal, magnetic record head means for directly receiving said amplified television signal, a high frequency biasing oscillator for supplying a constant frequency biasing signal wave to said head means thereby superimposing said biasing signal on said amplified television signal, and an electronic means for synchronizing the biasing signal with the separated sync pulses.

2. Magnetic recording system as set forth in claim 1, wherein said head means comprises a single magnetic recording head.

3. Magnetic recording system as set forth in claim 1, wherein said head means are divided into two heads to form a cross-field system, one of said heads being arranged for the reception of said amplified television signal, and the other of said two heads being arranged to receive said synchronized biasing signal wave.

4. Magnetic recording system as set forth in claim 1, wherein said biasing oscillator is fed with a series of pulses kept in synchronism with horizontal sync pulses contained in the television signal for ceasing the oscillating operation of said oscillator during the duration period of each of said fed pulses.

5. Magnetic recording system as set forth in claim 1 wherein said biasing oscillator comprises a transistor and an oscillating coil, and means coupled therewith for receiving a series of pulses kept in synchronism with said separated sync pulses, said oscillating coil having a ringing wave voltage induced therein in response to a synchronized pulse, the amplitude of said ringing voltage being equal to or larger than the normal oscillating voltage of said oscillator whereby the phase of the oscillating voltage of said oscillator will be brought into coincidence with said ringing voltage.

6. Magnetic recording system as set forth in claim 5, wherein said oscillating coil is provided with an intermediate tap for receiving series of pulses kept in synchronism with said separated sync pulses.

7. Magnetic recording system as set forth in claim 1, wherein said electronic means comprises a frequency divider connected to the output of said biasing oscillator to divide the frequency thereof by a certain integer to produce a reference signal, and a phase discriminator for comparing the output of said signal separator and said reference and producing a control signal, said biasing oscillator being responsive to said control signal to bring said biasing signal into coincidence with said sync pulses.

8. Magnetic recording system as set forth in claim 1, wherein said biasing oscillator is a frequency multiplier responsive to said sync pulses to produce said biasing signal having a frequency which is a certain multiple of the frequency of said sync pulses.

References Cited

UNITED STATES PATENTS

| | | | |
|---|---|---|---|
| 3,180,929 | 4/1965 | Hibbard et al. | |
| 3,197,210 | 7/1965 | Atsumi. | |
| 3,304,517 | 2/1967 | Yamanaka et al. ---- | 331—173 |
| 3,368,032 | 2/7968 | Gooch et al. | |

JOHN W. CALDWELL, Primary Examiner

D. E. STOUT, Assistant Examiner

U.S. Cl. X.R.

178—69.5; 179—100.2